United States Patent
Yang et al.

(10) Patent No.: US 11,943,767 B2
(45) Date of Patent: Mar. 26, 2024

(54) METHODS AND SYSTEM FOR NEGATIVE ACKNOWLEDGEMENT (NACK)-TRIGGERED SOUNDING REFERENCE SIGNAL (SRS) TRANSMISSIONS

(71) Applicant: QUALCOMM Incorporated, San Diego, CA (US)

(72) Inventors: Wei Yang, San Diego, CA (US); Yi Huang, San Diego, CA (US); Ahmed Elshafie, San Diego, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 17/447,735

(22) Filed: Sep. 15, 2021

(65) Prior Publication Data

US 2022/0095339 A1 Mar. 24, 2022

Related U.S. Application Data

(60) Provisional application No. 63/082,402, filed on Sep. 23, 2020.

(51) Int. Cl.
| | |
|---|---|
| *H04W 72/12* | (2023.01) |
| *H04L 1/18* | (2023.01) |
| *H04L 1/1867* | (2023.01) |
| *H04L 1/20* | (2006.01) |
| *H04L 5/00* | (2006.01) |
| *H04W 52/08* | (2009.01) |
| *H04W 52/10* | (2009.01) |
| *H04W 52/14* | (2009.01) |

(Continued)

(52) U.S. Cl.
CPC ....... *H04W 72/1273* (2013.01); *H04L 1/1896* (2013.01); *H04L 1/203* (2013.01); *H04L 5/0051* (2013.01); *H04W 52/08* (2013.01); *H04W 52/10* (2013.01); *H04W 52/14* (2013.01); *H04W 72/044* (2013.01); *H04W 72/23* (2023.01)

(58) Field of Classification Search
CPC .......... H04W 72/1273; H04W 72/042; H04W 72/044; H04W 72/14; H04W 52/08; H04W 52/10; H04W 52/14; H04W 52/325; H04W 72/23; H04L 1/203; H04L 5/0051; H04L 5/01; H04L 5/001; H04L 1/1896
USPC .................................................. 370/329–330
See application file for complete search history.

(56) References Cited

U.S. PATENT DOCUMENTS

2012/0275395 A1* 11/2012 Gerstenberger ...... H04L 5/0055
 370/329
2019/0053103 A1* 2/2019 Manolakos ........... H04W 28/20
(Continued)

*Primary Examiner* — Candal Elpenord
(74) *Attorney, Agent, or Firm* — Haynes and Boone, LLP/Qualcomm Incorporated

(57) ABSTRACT

Wireless communications systems and methods related to negative acknowledgement (NACK)-triggered sounding reference signal transmissions are provided. In some aspects, a user equipment may detect an error when decoding a data transmission received from a base station via a bandwidth part. The UE may then trigger, in response to detecting the error, a transmission to the BS of a first sounding resource signal using a first SRS resource set of the bandwidth part.

30 Claims, 8 Drawing Sheets

(51) Int. Cl.
*H04W 72/04* (2023.01)
*H04W 72/044* (2023.01)
*H04W 72/1273* (2023.01)
*H04W 72/14* (2009.01)
*H04W 72/23* (2023.01)

(56) References Cited

U.S. PATENT DOCUMENTS

| | | | |
|---|---|---|---|
| 2020/0374814 A1* | 11/2020 | Gong | H04W 52/34 |
| 2020/0404593 A1* | 12/2020 | Yao | H04W 52/54 |
| 2021/0337568 A1 | 10/2021 | Xu et al. | |
| 2021/0367727 A1* | 11/2021 | Go | H04L 5/0048 |
| 2021/0377876 A1* | 12/2021 | Jeon | H04W 24/08 |
| 2022/0030620 A1* | 1/2022 | Cirik | H04B 7/088 |
| 2022/0046552 A1* | 2/2022 | Xu | H04W 74/004 |

* cited by examiner

METHODS AND SYSTEM FOR NEGATIVE ACKNOWLEDGEMENT (NACK)-TRIGGERED SOUNDING REFERENCE SIGNAL (SRS) TRANSMISSIONS

CROSS-REFERENCE TO RELATED APPLICATIONS

The present application claims priority to and the benefit of the U.S. Provisional Patent Application No. 63/082,402, filed Sep. 23, 2020, titled "Methods and System for Negative Acknowledgement (NACK)-triggered Sounding Reference Signal (SRS) Transmissions," which is hereby incorporated by reference in its entirety as if fully set forth below and for all applicable purposes.

TECHNICAL FIELD

The technology described below relates generally to wireless communication systems, and more particularly to negative acknowledgement (NACK)-triggered sounding reference signal (SRS) transmissions.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices (e.g., user equipment (UE)).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum.

NR may allow for channel quality measurements and beam management with the use of sounding reference signals (SRSs) that are transmitted by UEs and received by BSs. A BS to which a UE is attached may schedule the transmission of the SRSs by the UE and further indicate to the UE the resources that the UE may use in transmitting the SRSs. In some cases, the BS may configure the resources to be used for transmitting the SRSs. The BS may then use these SRSs, for example, for uplink (UL) beam refinements to identify a preferred receive (RX) beam and to aid the UE to identify a preferred transmit (TX) beam.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects of the disclosure, a method of wireless communication performed by a user equipment (UE), comprises detecting an error when decoding a data transmission received from a base station (BS) via a bandwidth part (BWP). In some aspects, the method may further comprise triggering, in response to detecting the error, a transmission to the BS of a first sounding reference signal (SRS) using a first SRS resource set of the BWP.

In some aspects of the disclosure, a UE comprises a processor configured to detect an error when decoding a data transmission received from a BS via a BWP. Further, in some aspects, the processor may be configured to trigger, in response to detecting the error, a transmission to the BS of a first SRS using a first SRS resource set of the BWP.

Some aspects of the disclosure disclose a non-transitory computer-readable medium having program code recorded thereon. In some aspects, the program code comprises code for causing a UE to detect an error when decoding a data transmission received from a BS via a BWP. Further, the program code comprises code for causing the UE to trigger, in response to detecting the error, a transmission to the BS of a first SRS using a first SRS resource set of the BWP.

In some aspects of the disclosure, a UE comprises means for detecting an error when decoding a data transmission received from a BS via a BWP. Further, the UE may comprise means for triggering, in response to detecting the error, a transmission to the BS of a first SRS using a first SRS resource set of the BWP.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
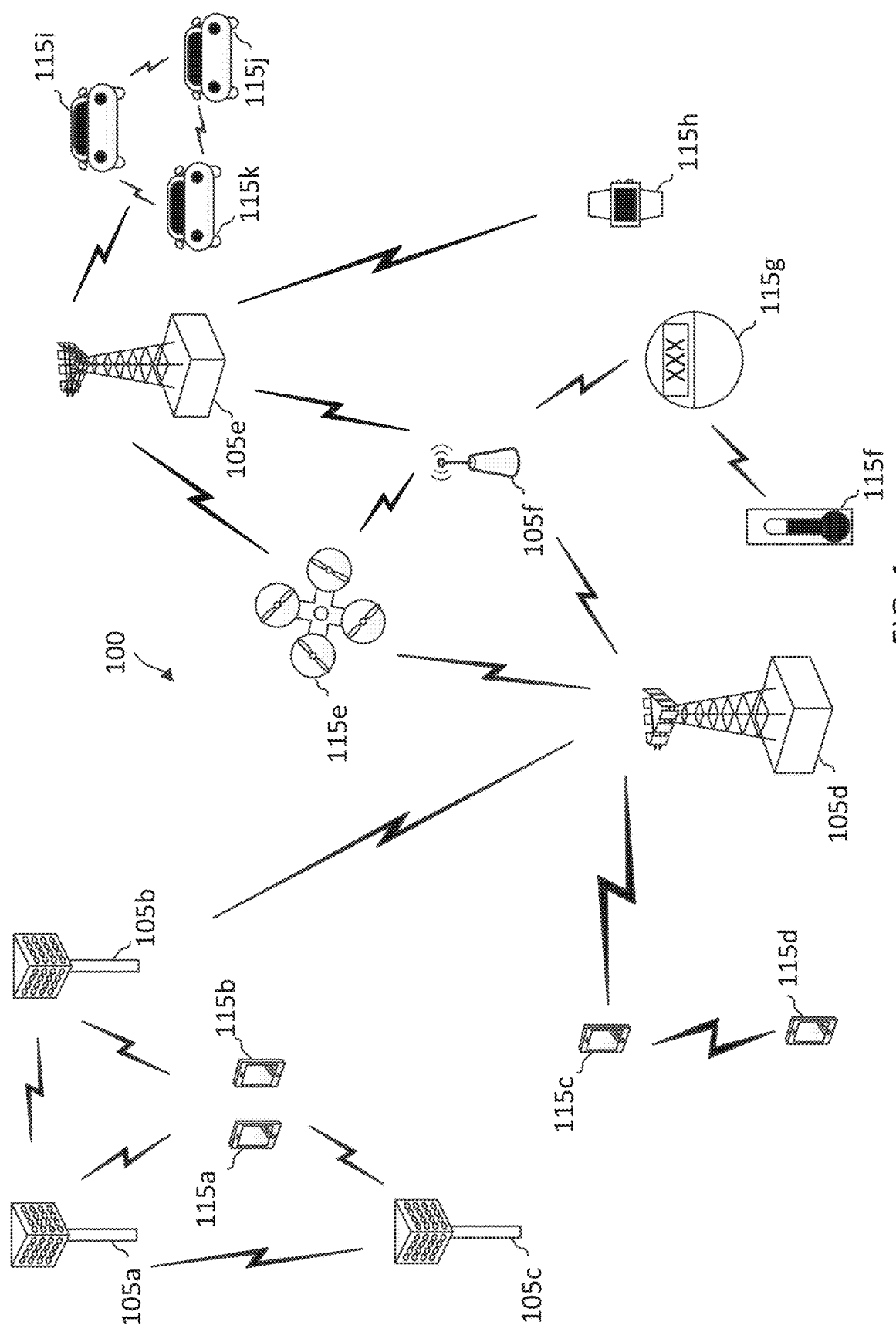
FIG. 1 illustrates a wireless communication network, according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a certain wireless communication network, a BS may configure each connected UE with one or more sounding reference signal (SRS) resource sets for using to transmit SRS to the BS. Each SRS resource set may include one or more SRS resources. Each SRS resource may be associated with one or more SRS ports. An SRS port may be mapped to a transmit antenna port of the UE which may be used to sound an SRS transmission and may correspond to a certain transmission layer. The BS may configure a quantity of SRS ports for the SRS resources according to a quantity of transmit antenna ports and/or a quantity of receive antenna ports supported by the respective UE. For instance, if the UE has four transmit antenna ports and four receive antenna ports, the BS may configure the UE to transmit an SRS using four SRS ports. However, in some scenarios, it may be sufficient for the UE to sound a subset of the configured SRS ports instead of all the configured SRS ports. For example, in some instances, an SRS transmission may be used for estimations other than UL sounding. For instance, in channel reciprocity operations, an SRS can be used for DL channel state information (CSI) acquisition.

In a certain wireless communication network, a BS may schedule, using an UL or a DL scheduling grant, a UE to transmit aperiodic SRS (A-SRS) to the BS. For example, the UL or DL scheduling grant may be transmitted to the UE via a downlink control information (DCI) transmission. In some aspects, the A-SRS may be transmitted to the BS via a SRS resource in a SRS resource set with an aperiodic resource type, i.e., a SRS resource set that may be utilized by the UE when the UE receives explicit trigger (e.g., the DCI transmission) from the BS. Upon receiving the A-SRS from the UE, in some aspects, the BS may use the A-SRS to acquire CSI about the UL or DL channel.

In some aspects, the BS may use A-SRS to acquire CSI about a channel after receiving a negative acknowledgement (NACK) from the UE about a DL data transmission (e.g., physical downlink shared channel (PDSCH) transmission) from the BS to the UE. For example, a BS may transmit a PDSCH transmission to the UE and may receive a NACK back from the UE (e.g., due to erroneous decoding of the DL transmission by the UE). In some cases, the BS may then trigger an A-SRS transmission from the UE to use the A-SRS transmission to obtain CSI about the channel of the DL transmission. For instance, the BS may use the next DL scheduling grant (e.g., DCI transmission) to the UE to trigger the UE to transmit an A-SRS back to the BS. In some aspects, however, such a process may be too slow, because by the time the BS receives the A-SRS, there may not be enough time left for the BS to use the acquired CSI to re-transmit the PDSCH transmission that caused the UE to send the NACK. As such, it may be desirable to allow the UE to autonomously (i.e., without being triggered by the BS) transmit an A-SRS to the UE when the UE detects a NACK on the PDSCH transmission.

In some aspects, UEs and BSs may support retransmissions of data to increase the likelihood that data is received successfully. Hybrid automatic repeat request (HARQ) feedback is one technique for increasing the likelihood that data is received correctly over a communication link. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval. In some aspects, the physical hybrid automatic repeat request (HARQ) indicator channel (PHICH) carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

Aspects of the present disclosure can provide several benefits, including improving latency and network efficiency and functionality. For example, by allowing the UE to transmit a A-SRS along with a NACK on a received PDSCH transmission, some aspects reduce or altogether eliminate the time it may take the BS to generate and send to the UE the next DL scheduling grant or DCI that triggers the A-SRS and receive in return the A-SRS from the UE. In some aspects, with the BS having received the A-SRS sooner than would be otherwise, the BS can have at least sufficient time to use the A-SRS for re-transmitting the PDSCH transmission, which improves latency and network efficiency.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. ABS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 may be dispersed throughout the wireless network 100, and each UE 115 may be stationary or mobile. UEs can take in a variety of forms and a range of form factors. A UE 115 may also be referred to as a terminal, a mobile station, a subscriber unit, a station, or the like. A UE 115 may be a cellular phone, a personal digital assistant (PDA), a smartphone, a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. The random access procedure (or RACH procedure) may be a single or multiple step process. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. Scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple bandwidth parts (BWPs) (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the BS 105 may engage in beam management procedures with UE 115 to acquire and maintain a suitable set of beams for communication between BS 105 and UE 115. For example, beam management procedures may include beam determination procedures where suitable beams are identified and selected at the BS 105 or the UE 115 based on evaluations of beam quality. To assist the BS 105 and/or the UE 115 in determining identifying and selecting suitable beams for communication, the BS 105 may configure each UE 115 to sound one or more transmit antenna ports of the respective UE 115. Sounding may refer to the transmission of an SRS via one or more antenna ports of a SRS resource (of a SRS resource set). The SRS may include a waveform sequence (e.g., predetermined) that are known to the BS 105 and the UE 115. For instance, the SRS may be Zadoff-Chu sequence or any suitable waveform sequence. In some instances, a transmit antenna port at a UE 115 may map to a physical transmit antenna element of the UE 115. In some other instances, a transmit antenna port at a UE 115 may be a virtual antenna port or a logical port created by the UE 115, for example, via precoding. Precoding may include applying different amplitude weights and/or different phased adjustments to signals output by the physical transmit antenna elements of the UE 115 to produce a signal directed towards a certain spatial direction. In some aspects, the network 100 may operate in a TDD mode. The BS 105 may also estimate DL channel characteristics from UL SRSs received from the UEs 115 based on TDD channel reciprocity.

In some aspects, SRS resource sets including one or more SRS resources may also be configured for other new radio (NR) use cases or operations, such as but not limited to antenna switching use cases or operations. For example, SRS resource sets be configured to support antenna switching for SRS transmission. In some aspects, antenna switching can occur at the UE transmitter or the UE receiver for UL or DL communications, respectively. In some aspects, antenna switching at the UE transmitter may refer to the UE transmitter utilizing smaller number of transceiver units or radio frequency chains than the available number of antennas, while antenna switching at the UE receiver may refer to the UE processing signals received via some receiving antennas but not all receiving antennas. For example, when configured for antenna switching at the UE receiver, the UE can dynamically use an antenna subset that may have optimal or near optimal instantaneous link conditions to the transmitter of the BS, and process only signals received by those antennas. In some aspects, a SRS resource set configured for antenna switching use case or operation may facilitate antenna switching for an uplink SRS transmission, for example by specifying the order of the antenna ports that may be used for the SRS transmission in the UL direction.

In some aspects, codebook-based or noncodebook-based transmissions can be example of NR use cases or operations supported by SRS resource sets, i.e., SRS resource sets can be configured to support codebook-based or non-codebook-based UL transmissions or PUSCH transmissions. In some aspects, for codebook-based transmission, the UE may be configured with a SRS resource set and only one SRS resource can be indicated based on a SRS resource indicator (SRI) field in the DCI from within the SRS resource set. The UE may then determine its PUSCH transmission precoder based on the SRI, transmitted precoding matrix indicator (TPMI) and the transmission rank from the DCI. In some cases, if A-SRS is configured for a UE, the SRS request field in the DCI can trigger the transmission of A-SRS. For non-codebook-based transmission, in some aspects, the UE can determine its PUSCH precoder and transmission rank based on the wideband SRI given by SRS resource indicator field from the DCI.

Figure 2:
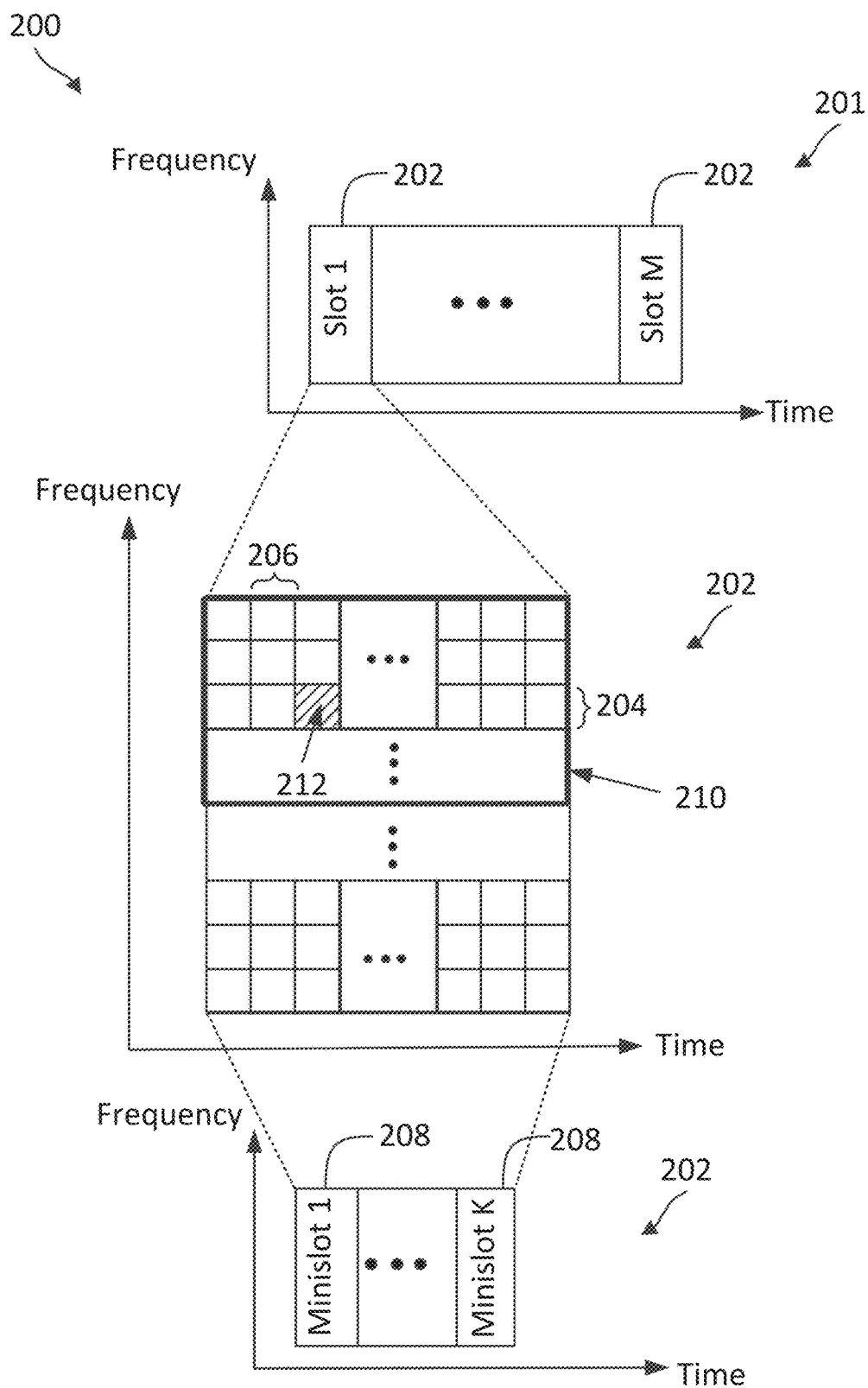
FIG. 2 illustrates a radio frame structure, according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications, for example, for the transmission of SRS from the UEs to the BSs. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the cyclic prefix (CP) mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204). In an example, a BS (e.g., BS 105 in FIG. 1) may schedule a UE (e.g., UE 115 in FIG. 1) for UL and/or DL communications at a time-granularity of slots 202 or mini-slots 208.

In some aspects, a SRS may span one, two or four consecutive symbols and may be located within the last six symbols of a slot (i.e., in the time domain of the radio frame structure 200 that includes the time and frequency resources). In the frequency domain, an SRS may have a "comb" structure, i.e., the SRS may be transmitted on every second subcarrier ("comb-2") or fourth ("comb-4") subcarrier. In some aspects, SRS transmissions from different devices may be frequency multiplexed within the same frequency range by assigning different combs corresponding to different frequency offsets. For example, for "comb-2" and for "comb-4", two SRSs and up to four SRSs, respectively, can be frequency multiplexed.

Figure 3:
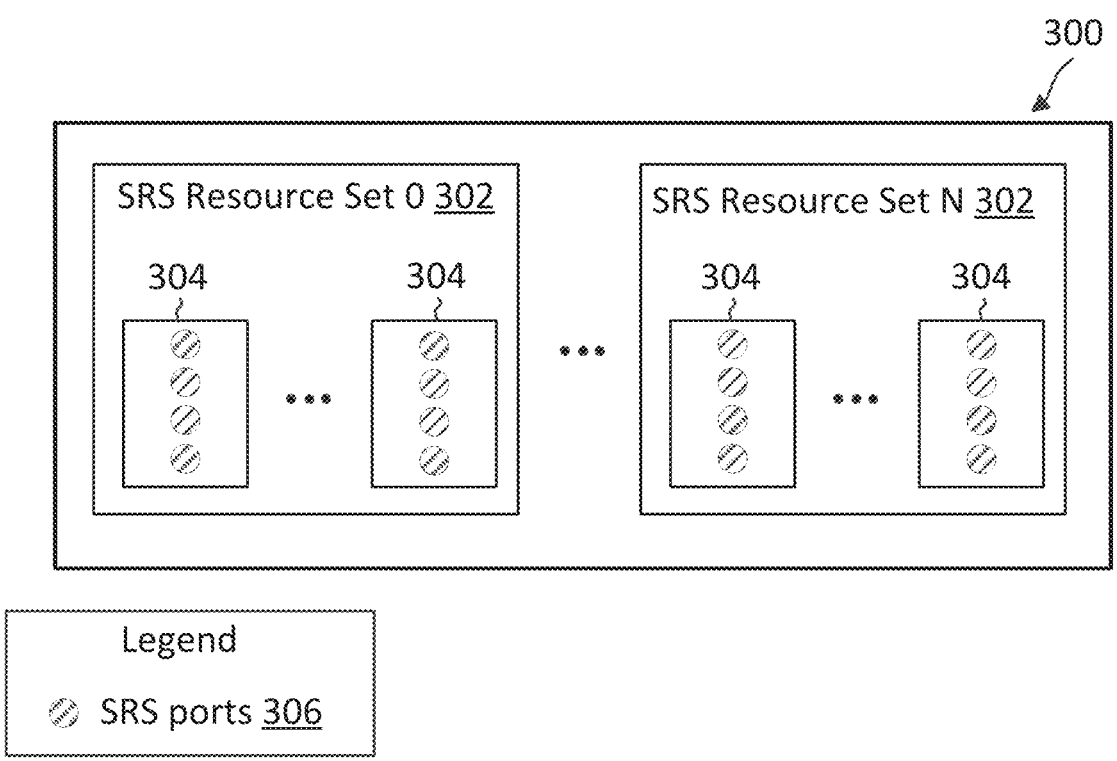
FIG. 3 illustrate example configuration of one or more sounding reference signal (SRS) resource sets, according to some aspects of the present disclosure.

FIG. 3 illustrates example configuration of a UE with one or more SRS resource sets according to some aspects of the present disclosure. The configuration 300 includes a plurality of SRS resource sets 302 (shown as SRS resource set 0 to SRS resource set N), each SRS resource set 302 including one or more SRS resources 304, i.e., one or more configured SRSs. Each SRS resource 304 may include time-frequency resources. For instance, each SRS resource 304 may span one or more symbols (e.g., the symbols 206) within a slot (e.g., the slot 202) and may include one or more subcarriers (e.g., the subcarriers 204) or REs (e.g., the REs 212) within each SRS symbol. Additionally, each SRS resource 304 may be configured with one or more SRS ports 306 (e.g., up to four SRS ports). For instance, each SRS port 306 may be associated with one or more REs within an SRS symbol. A UE 304 may transmit an SRS via a transmit antenna port, and the SRS can assist the BS 302 in performing beam management procedures including beam refinement, facilitating communication with the UE 304.

In some aspects, each SRS resource set 302 may be associated with a certain resource type. For example, an SRS resource set 302 may have a resource type of periodic, semi-persistent, or aperiodic. An SRS resource set 302 with a periodic resource type may have a configured periodicity and each periodic SRS resource 304 may have a configured symbol offset within a slot. A UE 304 may utilize a periodic SRS resource 304 for periodic SRS transmission. An SRS resource set 302 with a semi-persistent resource type may have a configured periodicity similar to a periodic SRS resource set 302 and each semi-persistent resource 304 may have a configured symbol offset within a slot similar to a periodic SRS resource 304. However, a UE 304 may not transmit an SRS in a semi-persistent SRS resource 304 until the BS 302 triggers an activation (e.g., via MAC-CE) of the SRS resource 304. An SRS resource 304 in an SRS resource set 302 with an aperiodic resource type may be utilized by a UE 304 when the UE 304 receives an explicit trigger (e.g., via DCI) from the BS 302.

As discussed above, the configuration 300 includes multiple resources sets 302 each including one or more SRS resources 304. In aspects where the SRS transmitted by the UE using the SRS resources is used for beam management by the BS to which the UE is attached, only one SRS resource in each of the one or more SRS resources may be transmitted at a given time instant, while SRS resources in different SRS resources sets with the same time domain behavior in the same bandwidth part can be transmitted simultaneously.

In some aspects, the parameters of an SRS may be semi-statically configured, i.e., may be configured via an RRC message. For example, an RRC message may configure SRS parameters such as but not limited to SRS bandwidth (i.e., bandwidth to be used for transmission of a SRS), a timing or slot offset between the SRS transmission and the transmission (e.g., DCI transmission) triggering the SRS transmission, starting symbol of the SRS resource, transmission comb value (TxComb) and offset (e.g., for comb-2 or comb-4), cyclic shift (e.g., for TxComb value 2 and 4), an ID of the reference signal (RS) associated with the SRS transmission, etc. In some aspects, the RS can be an SS/PBCH block, CSI-RS configured on the BS to which the UE is attached. In some aspects, a transmission comb is a distributed comb-shaped transmission with equally-spaced outputs allocated over the entire bandwidth.

In some aspects, the SRS can be quasi co-located (QCL'ed) with the SSB, CSI-RS or another RRC configured SRS. For example, the SRS resource can be transmitted with the same spatial domain transmission filter as used for the Rx/Tx of the RS. Quasi co-location (QCL) refers to the relationship between two signals where properties of a channel over which a symbol on one antenna port is conveyed can be inferred from the channel over which a symbol on the other antenna port is conveyed, examples of the noted properties including but not limited to Doppler shift, Doppler spread, average delay, delay spread, spatial RX parameters when applicable, and/or the like.

In some aspects, power control for the SRS transmission by the UE may be controlled by the BS to which the UE is attached. For example, the UE may compute the transmit power, denoted as $P_{SRS}$, as shown below:

$$P_{SRS} = \min[P_{cmax}, P_{O\_SRS} + 10 \times \log(2^\mu \cdot M_{SRS}) + \alpha_{SRS} \cdot PL + h] \quad (1)$$

where $P_{cmax}$ represents the maximum transmit power configured for the UE, for example, according to a particular communication standard. $P_{O\_SRS}$ represents an open loop power control parameter and can be a frequency parameter configured by the BS, such as a target power spectral density. $M_{SRS}$ represents the number of SRS frequency resources (e.g., REs) in the full set of SRS frequency resources assigned to the UE. PL represents estimated path loss (e.g., measured by DL reference signals). $\alpha_{SRS}$ represents an open loop power control parameter and represents the factor, which may have a value between 0 and 1, to enable or disable fractional power control or cell specific factor, which may be configured by the BS. h represents a closed-loop component of the power control, for example, received from a transmission power control (TCP) command issued by the BS 105 (e.g., via a DCI transmission).

In some aspects, the power control may be via a closed-loop transmission power control (TPC) command from the BS as part of the DCI transmission. In some aspects, the TPC command can be a group TPC command. For example, the UE may receive a DCI format 2_3 transmission (e.g., group-common DCI for power control for SRS) of TPC command(s) for SRS transmissions from the BS, and the SRS transmission power may follow the TPC command(s). In some aspects, the SRS power may be in accordance with closed-loop TPC command(s) from a BS to a PUSCH transmission. That is, the SRS transmission power may be related to a PUSCH transmission power as dictated by closed-loop TPC command(s) from the BS. For example, one or more of the parameters of equation 1 (e.g., $P_{cmax}$, $P_{O\_SRS}$, $\alpha_{SRS}$, PL, h, and/or the like) may be associated with corresponding parameters used to determine a transmission power for the PUSCH signal. For instance, the closed-loop component h of the $P_{SRS}$ may be associated (e.g., be equal to) the closed-loop component of the transmit power of the PUSCH transmission. That is, if the transmission of the first SRS follows transmission of the PUSCH signal, the UE may determine a respective value of the one or more of the parameters in equation 1, based on the value of the corresponding parameters used to determine the transmission power for the PUSCH signal.

In some aspects, a codepoint of the DCI may trigger one or more aperiodic resource sets configured for a UE. For example, a DCI transmission (e.g., DCI format 0_1 (uplink scheduling grant) and DCI format 1_1 (downlink scheduling assignment)) may include a 2-bit SRS-request that can trigger transmission of one of three different aperiodic resource sets configured for the UE (while the fourth bit combination corresponds to "no triggering" of the SRS resource sets). In some aspects, the minimal time interval between the last symbol of a transmission (e.g., PDCCH transmission) that triggers a aperiodic SRS transmission and the first symbol of the triggered SRS resource is $N_2+14$, where $N_2$ is a number (in symbols) related to UE capability. Further, in some aspects, when a UE receives a DCI that triggers aperiodic SRS in slot n, the UE may transmit aperiodic SRS in each of the triggered SRS resource set(s) in slot $n \cdot 2^{\mu\_SRS}/2^{\mu\_PDCCH}+k$, where k is the semi-statically configured timing or slot offset (e.g., configured by an RRC message) for each triggered SRS resources set and is based on the subcarrier spacing of the triggered SRS transmission, and $\mu_{SRS}$ and $\mu_{PDCCH}$ are the subcarrier spacing configurations for the triggered SRS transmission and the transmission (e.g., PDCCH transmission) triggering the SRS transmission, respectively. In some aspects, the semi-statically configured timing or slot offset k can be a value between 1 slot and 32 slots.

In some aspects, each SRS resource set 302 may be configured for a certain use case or operation, for example, for UL CSI acquisition, DL CSI acquisition (assuming TDD channel reciprocity), and/or beam management. For instance, the BS 302 may determine UL transmission schemes and/or UL precoding based on acquired UL CSI. The BS 302 may determine antenna switching or selection based on DL CSI. In an example, for DL CSI acquisition, the BS 302 may configure a UE 304 with up to two SRS resource sets 302, each having a different resource type. In some instances, the BS 302 may configure a UE 304 with zero or one SRS resource set 302 configured with a resource type of periodic or semi-persistent. In some other instances, the BS 302 may configure a UE 304 with zero to two SRS resource sets 302, each configured with a resource type of aperiodic.

In some aspects, SRSs transmitted by a UE to a BS to which the UE is attached may be used by the BS for channel quality measurements and beam management. In general, beam management refers to the four operations of beam sweeping, beam measurement, beam determination and beam reporting. In some aspects, beam sweeping operation refers to covering a spatial area with a set of beams transmitted and received according to pre-specified intervals and directions. In some aspects, with respect to UL transmission, beam measurement operation refers to the evaluation of the quality of signals received at a BS (e.g., as measured by signal to noise ratios). In some aspects, beam determination operation refers to the selection of a suitable beam(s) at the BS based on the measurement results from the beam measurement operations. In some aspects, beam reporting operation refers to the procedure used by the UE to send beam quality and beam decision information to the Radio Access Network (RAN).

Figure 4A:
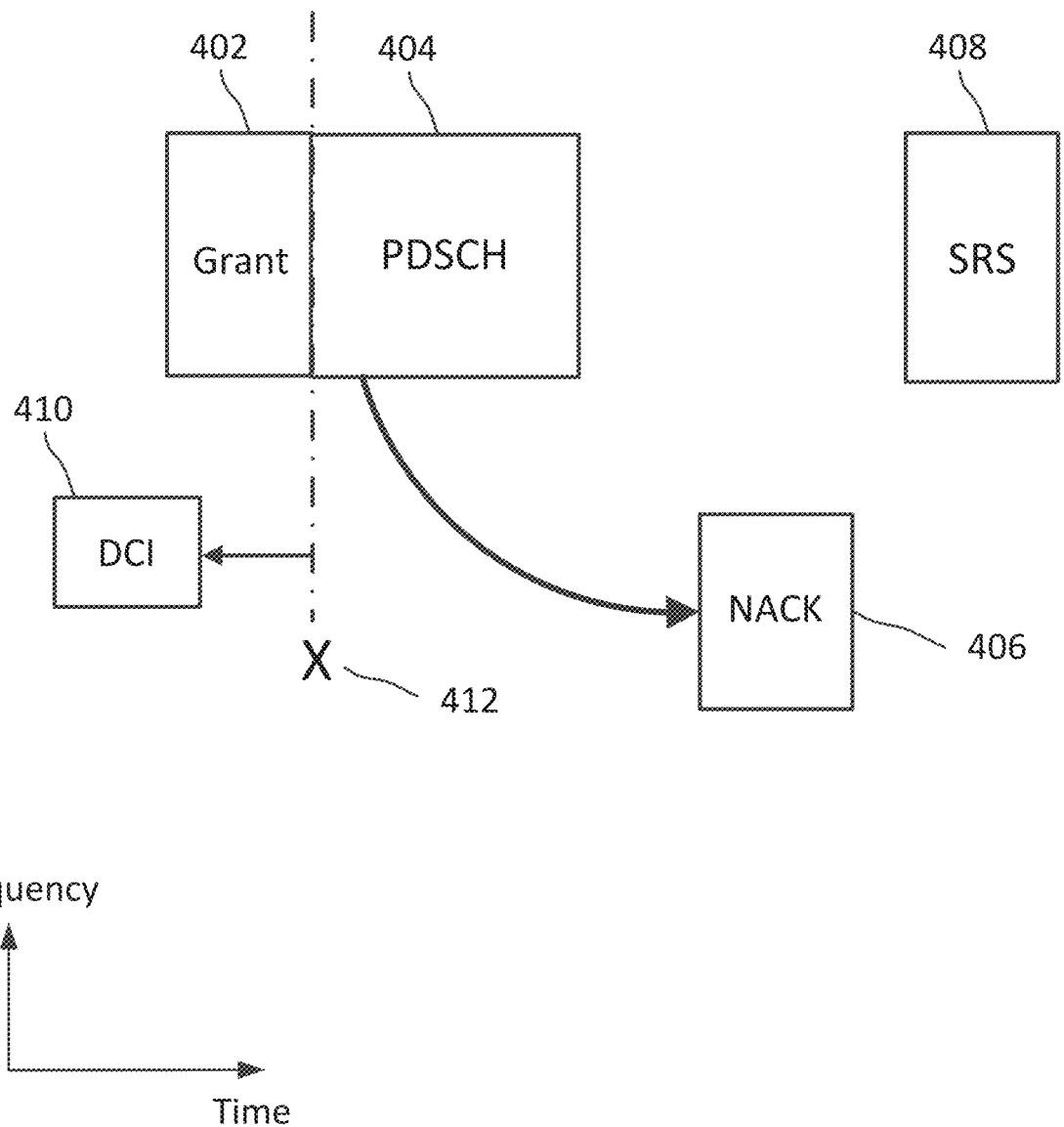
FIGS. 4A-B illustrate negative acknowledgement (NACK)-triggered sounding reference signal (SRS) transmission, according to some aspects of the present disclosure.
Figure 4B:
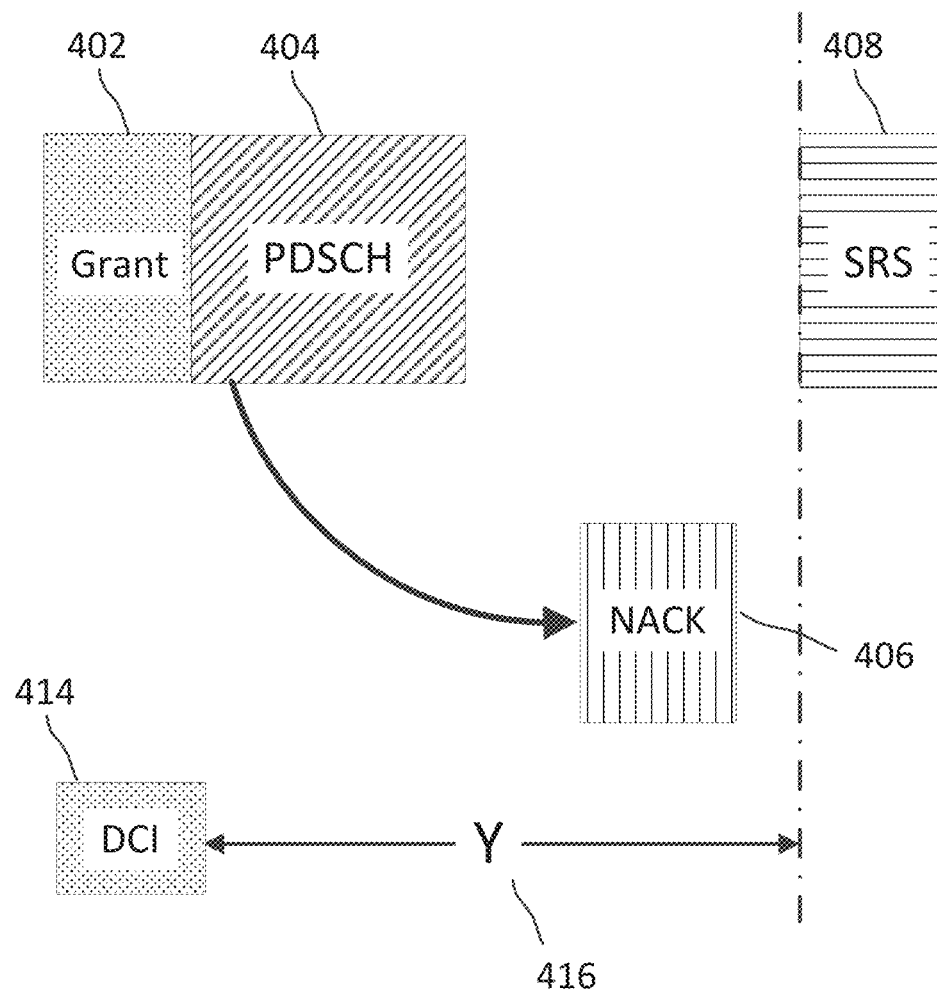
Figure 4B:
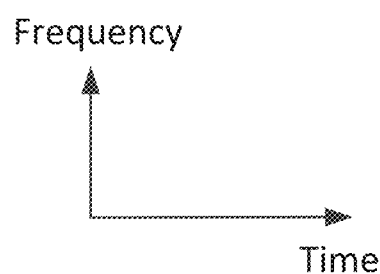

FIGS. 4A-B illustrate a NACK-triggered SRS transmission, according to some aspects of the present disclosure. In some aspects, a DL grant (e.g., PDCCH communication) 402 may schedule an ACK or NACK 406 for a downlink data transmission (e.g., PDSCH transmission) 404 transmitted to a UE from a BS via a BWP of a serving cell. In some cases, the UE may attempt to decode the PDSCH transmission 404 and generate an ACK or a NACK 406 for transmitting to the BS based on the results of the decoding. In some instances, the decoding results may indicate that the PDSCH transmission 404 was correct or erroneous, and the UE may generate an ACK or a NACK 406, respectively, for transmitting back to the BS. In some aspects, a NACK 406 for a PDSCH transmission 404 may trigger the UE to transmit a SRS (e.g., A-SRS) 408 to the BS.

In some aspects, the transmission of the NACK-triggered A-SRS 408 to the BS may occur via the same BWP on which the PDSCH transmission 404 was received at the UE. For example, the BS may configure a SRS resource set for the transmission, from the UE to the BS, of the NACK-triggered A-SRS 408 per BWP per serving cell, and use the configured SRS resource set in the same BWP as the BWP the BS used to transmit the PDSCH 404 to the UE to transmit the NACK-triggered A-SRS 408 to the BS. For example, the SRS resource set may be configured via a RRC message from the BS to the UE. In some aspects, the power control parameters for the NACK-triggered A-SRS 408 transmission may be configured to be different from or independent of the power control parameters of SRS from SRS resource sets configured for other NR use cases or operations, such as but not limited to SRS resource sets configured for "antenna switching" use case, "codebook-based or non-codebook-based UL transmission" use case, "beam management" use case, etc. For example, the SRS resource sets of the UE configured for the noted NR use cases may have associated therewith open-loop power control parameters $\alpha_{Use\ Case}$ and $P_{O_{Use\ Case}}$, and the open-loop power control parameters $\alpha_{A\text{-}SRS}$ and $P_{O_{A\text{-}SRS}}$ of the A-SRS 408 transmission may be different from or independent of the open-loop power control parameters of the SRS configured for the noted NR use cases or operations.

In some aspects, the NACK-triggered A-SRS 408 may be transmitted to the BS using the same SRS resource sets that are configured for transmitting SRS for the afore-mentioned NR use cases or operations. In some aspects, the UE may transmit the A-SRS 408 to the BS using the SRS resource sets configured for the NR use cases and configured in the same BWP as the BWP the BS used to transmit the PDSCH 404 to the UE. For example, the UE may transmit to the BS the A-SRS 408 using a SRS resource set configured for "antenna switching" NR use case in the same BWP as the BWP that the BS used to transmit to the UE the erroneous PDSCH 404. In some aspects, because the NACK-triggered A-SRS 408 is transmitted to the BS using SRS resource sets configured for the afore-mentioned NR use cases, the open-loop power control parameters of the A-SRS 408 may be same as the open-loop power control parameters of a SRS transmitted using the SRS resource sets configured for the afore-mentioned NR use cases or operations. For example, if the NACK-triggered A-SRS 408 is transmitted to the BS using a SRS resource set in a BWP configured for "antenna switching" NR use case or operation, the open-loop power control parameters of the NACK-triggered A-SRS 408 transmitted using a SRS resource set in the same BWP may be same as the open-loop power control parameters of a SRS transmission of "antenna switching" NR use case. In such cases, i.e., when SRS resource sets in a BWP configured for the afore-mentioned NR use cases are used to transmit the NACK-triggered A-SRS 408 in the same BWP, the UE may apply an additional power boost (e.g., in dB) to the A-SRS 408 transmission relative to the transmit power of a SRS transmission of the NR use case (e.g., a SRS of the NR use case transmitted using the SRS resource sets configured for the NR use cases).

In some aspects, the UE may determine the closed-loop power control parameters of the NACK-triggered A-SRS 408 based on a DCI transmission (e.g., in DCI 2_3 format) 410 or 414 from the BS that includes TPC command(s) related to the closed-loop power control parameters. For example, the TPC command(s) may specify a closed-loop component h of a power control, and the UE may generate the NACK-triggered A-SRS 408 with a transmit power corresponding to the closed-loop component h specified by the TPC command(s). In some aspects, the DCI transmission 410 which include the TPC command(s) may be received at the UE prior to the last symbol X 412 of the corresponding DL grant (e.g., PDCCH transmission) that scheduled the NACK transmission 406. That is, with reference to FIG. 4A, the UE may use TPC command(s) received in a DCI communication (e.g., DCI 2_3 format) 410 received prior to the last symbol X 412 of the DL grant that scheduled the NACK transmission 406 to determine the closed-loop component of the power control for the NACK-triggered A-SRS 408. In some aspects, the DCI transmission 414 which include the TCP command(s) may be received at the UE at least a threshold number of symbols prior to the NACK-triggered A-SRS 408 transmission. That is, with reference to FIG. 4B, the UE may use TPC command(s) received in a DCI communication (e.g., DCI 2_3 format) 414 received at least a threshold number of symbols Y 416 prior to the NACK-triggered A-SRS 408 transmission to determine the closed-loop component of the power control for the NACK-triggered A-SRS 408. In some aspects, if the UE receives the DCI but not (a) prior to the last symbol X 412 or (b) at least the threshold number of symbols Y 416 prior to the NACK-triggered A-SRS 408 transmission, the UE may discard the DCI communication (e.g., and as such may not determine the closed-loop component of the power control for the NACK-triggered A-SRS 408 based on the TCP command(s) in the DCI communication).

In some aspects, the threshold number of symbols may be determined based on an RRC message from the BS. For example, an RRC message from the BS may include the parameter K2 that may specify a gap in slots between a DCI message scheduling a UL transmission via a PDCCH and a latter UL transmission via a PUSCH. In some aspects, the threshold number of symbols may equal the number of symbols of slot delays corresponding to a minimum value of the RRC parameter K2 configured by the RRC message. For instance, K2 can have values 1, 2, 3, etc. (e.g., natural numbers up to and including 12) specified in PUSCH-ConfigCommon. In such cases, if K2 is configured to have the values {1, 2, 3}, for instance, then the minimum value of K2 is 1 and the number of symbols corresponding to this minimum value is 1*14 OFDM symbols=14 OFDM symbols. In such examples, as the threshold number of symbols equals the number of symbols of slot delays or symbols corresponding to the minimum value of the RRC parameter K2, then the threshold number of symbols can be 14 OFDM symbols.

In some aspects, a UE may be configured to transmit a periodic SRS to the BS, i.e., the UE may be configured to transmit to the BS a SRS with a configured periodicity using a periodic SRS resource set. In some aspects, the scheduled transmission of the periodic SRS may conflict with the transmission of the NACK-triggered A-SRS. In other words, the transmission of the NACK-triggered A-SRS may collide with a scheduled transmission of a periodic SRS. In such cases, i.e., when the transmission of the NACK-triggered A-SRS collide with a scheduled periodic SRS, the UE may be configured to abandon or abort the scheduled periodic SRS transmission and instead transmit the NACK-triggered A-SRS.

In some aspects, a collision may be defined as two or more transmissions in the same subframe. In another example, a collision may also be defined as two or more transmissions in the same symbol. For the former, it implies that simultaneous transmissions over two or more component carriers are not allowed, even if the transmissions may happen over different symbols in the same subframe and within each symbol there is only one transmission in the same subframe. For the latter, it implies that it is possible to have two or more transmissions in the same subframe, as long as within each symbol there is only one transmission in the same subframe. In any case, a collision between two transmissions (e.g., between the NACK-triggered A-SRS and the scheduled periodic SRS) may interfere or interrupt either or both transmissions.

In some aspects, as noted above, the BS may acquire a CSI report from the UE to determine, among other things, the quality of the channel for transmitting downlink data to the UE. In some aspects, the CSI report can be a periodic CSI (P-CSI) report, a semi-persistent CSI (SP-CSI) report or an aperiodic CSI (A-CSI) report. In some cases, the UE may transmit the P-CSI report periodically to the BS via the PUCCH. In some aspects, P-CSI reporting parameters such as but not limited to the periodicity and the slot offset may be configured semi-statically (e.g., via RRC messages from the BS). In some aspects, the SP-CSI may have associated therewith a periodicity and a slot offset that are configured semi-statically by the BS. In some aspects, the SP-CSI may be reported periodically (e.g., with the configured periodicity) when triggered by the BS dynamically, and the triggered periodic reporting may cease when a command from the BS requesting that the UE cease the periodic reporting is received at the UE. In some cases, the SP-CSI report may be transmitted via PUSCH. In some aspects, the A-CSI may be reported to the BS when the BS transmits a dynamic trigger (e.g., DCI) to trigger the UE to transmit the A-CSI report. In some cases, the A-CSI reporting parameters may be configured semi-statically, however, the triggering may occur dynamically. In some aspects, the A-CSI report may be transmitted by the UE to the BS via PUSCH.

In some aspects, the scheduled transmission of a P-CSI or a SP-CSI by the UE to the BS may conflict with the transmission of the NACK-triggered A-SRS to the BS. In other words, the transmission of the NACK-triggered A-SRS to the BS may collide with a scheduled transmission of a P-CSI or SP-CSI report. In some aspects, when the transmission of the NACK-triggered A-SRS collide with a scheduled P-CSI or SP-CSI report transmission and the UE is not configured to or is incapable of transmitting both the NACK-triggered A-SRS and the P-CSI or SP-CSI report, the UE may be configured to abandon or abort the P-CSI or SP-CSI report transmission and instead transmit the NACK-triggered A-SRS.

In some aspects, the DL grant (e.g., PDCCH communication) 402 that is configured to trigger the NACK 406 may also be configured to trigger an A-SRS. In such cases, the UE may be configured to abandon or abort the transmission of the NACK-triggered A-SRS 408 and instead transmit to the BS the A-SRS that is triggered by the DL grant 402. In some cases, if the DL grant 402 that triggers the NACK 406 triggers an A-SRS, the NACK 406 may not trigger another A-SRS and the UE may transmit to the BS the A-SRS that is triggered by the DL grant 402. In some aspects, an UL grant to from the BS to the UE may trigger an A-SRS, and if the UE is not configured to or is incapable of transmitting both the NACK-triggered A-SRS and the A-SRS triggered by the UL grant, the UE may be configured to (i) always transmit the NACK-triggered A-SRS, (ii) always transmit the A-SRS triggered by the UL grant or (iii) determine whether to transmit the NACK-triggered A-SRS or the A-SRS triggered by the UL grant.

Figure 5:
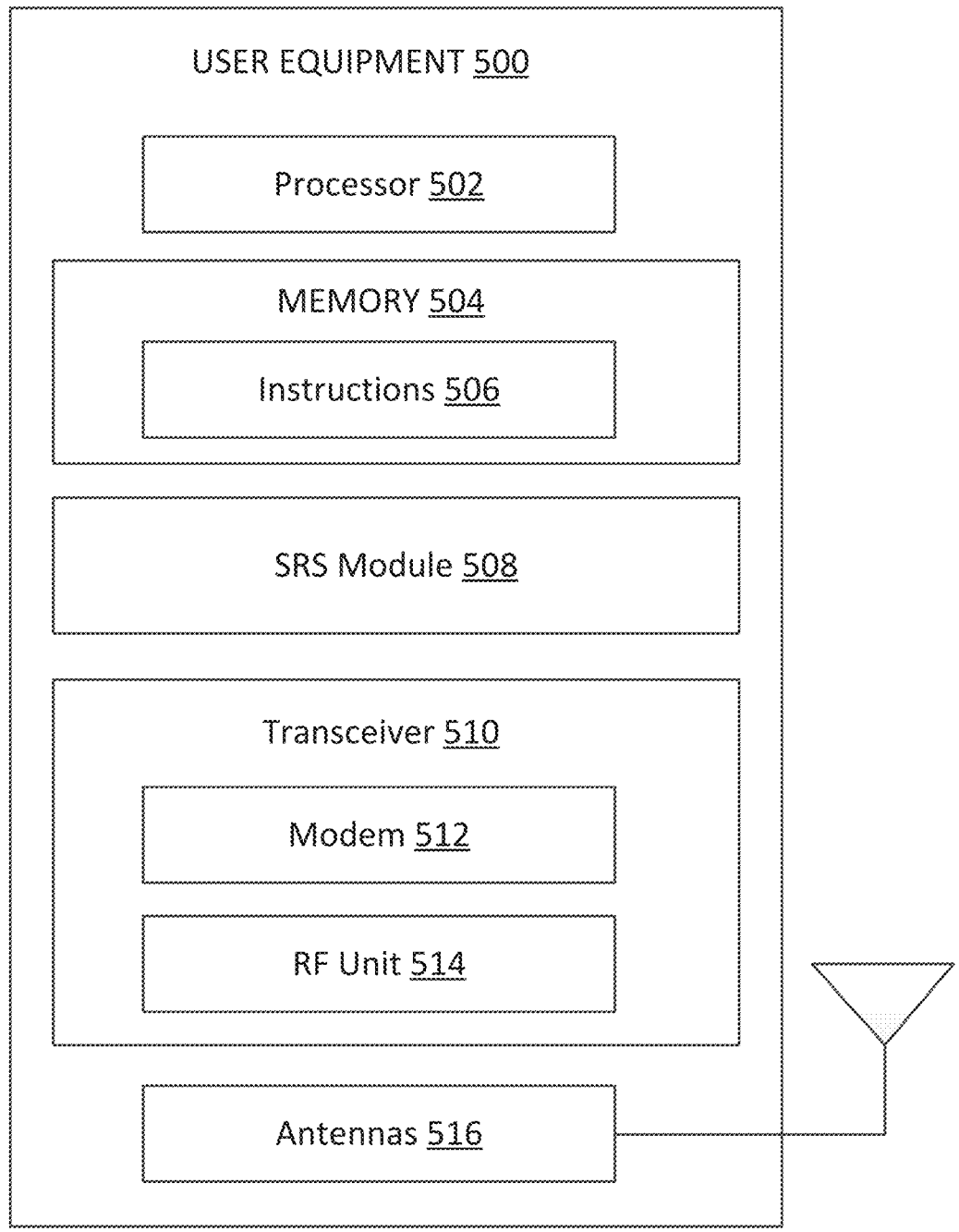
FIG. 5 is a block diagram of an exemplary user equipment (UE), according to some aspects of the present disclosure.

FIG. 5 is a block diagram of an exemplary UE 500 according to some aspects of the present disclosure. The UE 500 may be a UE 115 in the network 100 as discussed above in FIG. 1. As shown, the UE 500 may include a processor 502, a memory 504, an SRS module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-4 and 7. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SRS module 508 may be implemented via hardware, software, or combinations thereof. For example, the SRS module 508 may be implemented as a processor, circuit, and/or instructions 506 stored in the memory 504 and executed by the processor 502. In some examples, the SRS module 508 can be integrated within the modem subsystem 512. For example, the SRS module 508 can be implemented by a combination of software components (e.g., executed by a DSP or a general processor) and hardware components (e.g., logic gates and circuitry) within the modem subsystem 512.

The SRS module 508 may be used for various aspects of the present disclosure, for example, aspects of FIGS. 1-4 and 7. For example, the SRS module 508 may be configured to detect an error when decoding a data transmission received from a BS (e.g., the BSs 105 and/or 600) via a BWP. The SRS module 508 may also be configured to trigger, in response to detecting the error, a transmission to the BS of a first SRS using a first SRS resource set of the BWP.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., PDSCH signal, PDCCH signal, SRS resource configuration, SRS resource activation, SRS resource deactivation) from the modem subsystem 512 (on outbound transmissions) or of transmissions originating from another source such as a UE 115. The RF unit 514 may be further configured to perform analog beamforming in conjunction with the digital beamforming. Although shown as integrated together in transceiver 510, the modem subsystem 512 and/or the RF unit 514 may be separate devices that are coupled together at the UE 500 to enable the UE 500 to communicate with other devices.

The RF unit 514 may provide modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., PUSCH signal, UL data, SRSs, UE capability reports, RI reports) to the SRS module 508 for processing. The antennas 516 may include multiple antennas of similar or different designs to sustain multiple transmission links.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
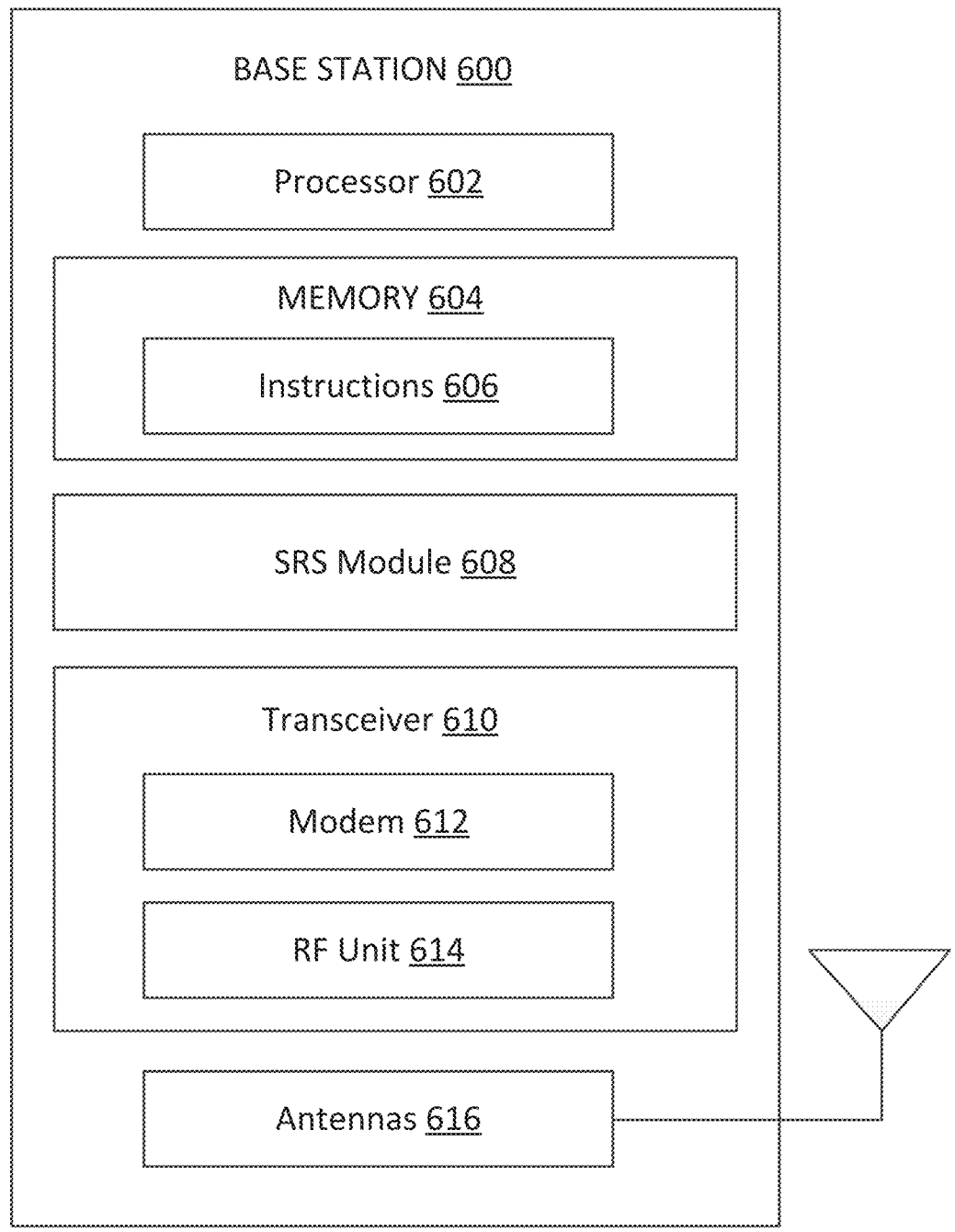
FIG. 6 is a block diagram of an exemplary base station (BS), according to some aspects of the present disclosure.

FIG. 6 is a block diagram of an exemplary BS 600 according to some aspects of the present disclosure. The BS 600 may be a BS 105 discussed above in FIG. 1. As shown, the BS 600 may include a processor 602, a memory 604, a SRS module 608, a transceiver 610 including a modem subsystem 612 and a radio frequency (RF) unit 614, and one or more antennas 616. These elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to the UEs 115 in connection with aspects of the present disclosure, for example, aspects of FIGS. 1-4, and 7. Instructions 606 may also be referred to as program code, which may be interpreted broadly to include any type of computer-readable statement(s) as discussed above with respect to FIG. 5.

The SRS module 608 may be implemented via hardware, software, or combinations thereof. For example the SRS module 608 may be implemented as a processor, circuit, and/or instructions 606 stored in the memory 604 and executed by the processor 602. In some examples, the SRS module 608 can be integrated within the modem subsystem 612. For example, the SRS module 608 can be implemented by a combination of software components (e.g., executed by a DSP or a general processor) and hardware components (e.g., logic gates and circuitry) within the modem subsystem 612. The SRS module 608 may be used for various aspects of the present disclosure, for example, aspects of FIGS. 1-4, and 7.

As shown, the transceiver 610 may include a modem subsystem 612 and an RF unit 614. The transceiver 610 can be configured to communicate bi-directionally with other devices, such as the BSs 105. The modem subsystem 612 may be configured to modulate and/or encode the data from the memory 604 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PUSCH signal, UL data, SRSs, UE capability reports, RI reports) from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the BS 600 to enable the BS 600 to communicate with other devices.

The RF unit 614 may provide modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., PDSCH signal, PDCCH, DL data, SRS resource configuration, SRS resource activation, SRS resource deactivation) to the SRS module 608. The antennas 616 may include multiple antennas of similar or different designs in order to sustain multiple transmission links. The RF unit 614 may configure the antennas 616.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

Figure 7:
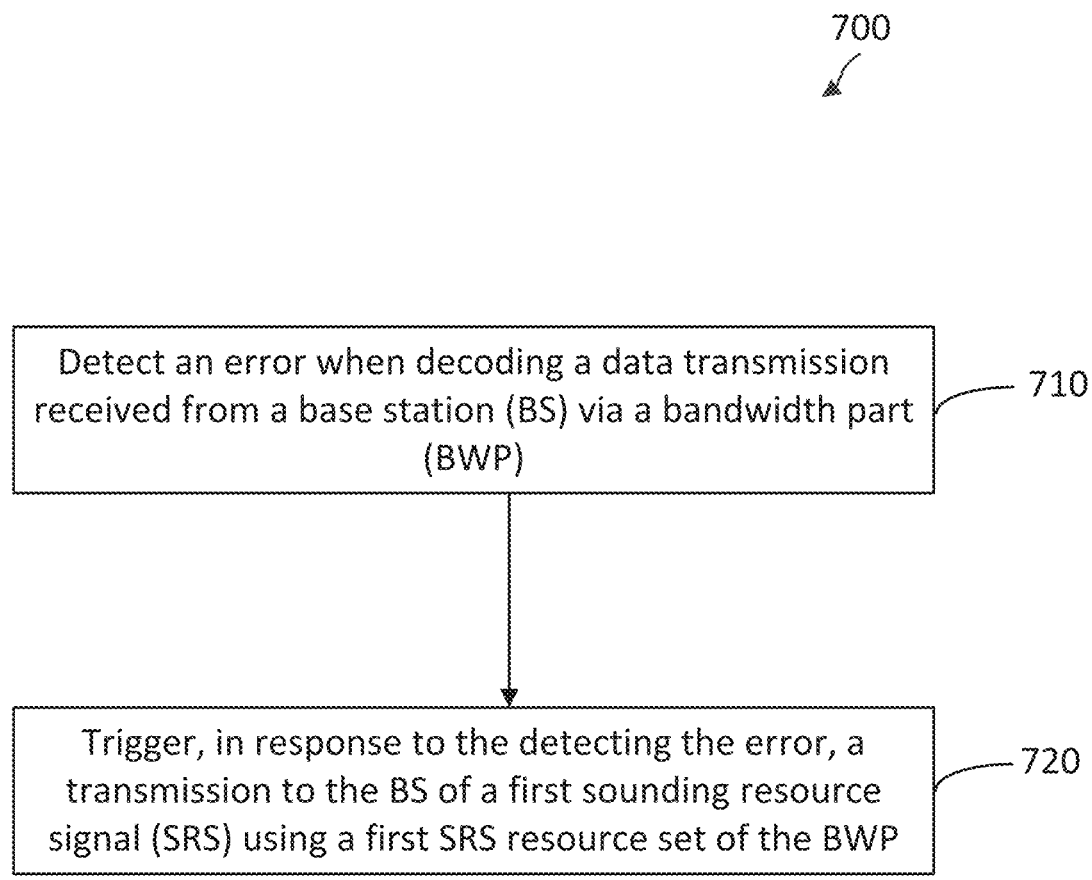
FIG. 7 is a flow diagram of a wireless communication method, according to some aspects of the present disclosure.

FIG. 7 is a flow diagram of a wireless communication method 700 according to some aspects of the present disclosure. Aspects of the method 700 can be executed by a computing device (e.g., a processor, processing circuit, and/or other suitable component) of a wireless communication device or other suitable means for performing the steps. For example, a wireless communication device, such as the UEs 115 and/or 500 may utilize one or more components, such as the processor 502, the memory 504, the SRS module 508, the transceiver 510, the modem 512, and the one or more antennas 516, to execute the steps of method 700. As illustrated, the method 700 includes a number of enumerated steps, but aspects of the method 700 may include additional steps before, after, and in between the enumerated steps. In some aspects, one or more of the enumerated steps may be omitted or performed in a different order.

At block 710, a UE (e.g., the UEs 115 and/or 500) can detect an error when decoding a data transmission received from a BS via a BWP. In some instances, the UE may utilize one or more components, such as the processor 502, the memory 504, the SRS module 508, the transceiver 510, the modem 512, and the one or more antennas 516, to detect an error when decoding a data transmission received from a BS via a BWP.

At block 720, a UE (e.g., the UEs 115 and/or 500) can trigger, in response to detecting the error, a transmission to the BS of a first SRS using a first SRS resource set of the BWP. In some instances, the UE may utilize one or more components, such as the processor 502, the memory 504, the SRS module 508, the transceiver 510, the modem 512, and the one or more antennas 516, to trigger, in response to the detecting the error, a transmission to the BS of a first SRS using a first SRS resource set of the BWP.

In some aspects of method 700, the BWP is the BWP of a PDSCH. In some aspects, an open-loop power control parameter of the first SRS is configured to be independent from a corresponding open-loop power control parameter of a second SRS configured to be transmitted using a second SRS resource set of the BWP, the second SRS resource set configured for a NR use case or operation. In some aspects, the NR use case or operation is an antenna switching use case. In some aspects, the NR use case or operation is a codebook or a non-codebook use case. In some aspects, the NR use case or operation is a beam management use case.

In some aspects, the first SRS resource set is configured for an antenna switching operation. In some instances, an open-loop power control parameter of the first SRS is configured to be same as a corresponding open-loop power control parameter of a second SRS of the antenna switching operation configured to be transmitted using the first SRS resource set. In some instances, a transmit power of the first SRS is configured to exceed a transmit power of a second SRS of the antenna switching operation configured to be transmitted using the first SRS resource set.

Some aspects of method 700 further comprise receiving, from the BS, a DCI message including TPC command(s) to configure a closed-loop power control parameter of the first SRS. In some aspects, the method 700 further comprising receiving, from the BS, a PDCCH communication configured to schedule the data transmission received from the BS, the DCI message received prior to a last symbol of the PDCCH communication. In some aspects, method 700 further comprises configuring, in response to the DCI message being received prior to the last symbol of the PDCCH communication, the closed-loop power control parameter of the first SRS. In some aspects, the DCI message is received at least a threshold number of symbols prior to a start of the transmission of the first SRS. In some aspects, method 700 further comprises configuring, in response to the DCI message being received at least the threshold number of symbols prior to the start of the transmission of the first SRS, the closed-loop power control parameter of the first SRS. In some aspects, the threshold number of symbols is equal to a number of slot delays corresponding to a minimum value of a RRC parameter K2 configured by a RRC message from the BS. In some aspects, the first SRS resource set is an aperiodic SRS resource set.

Some aspects of method 700 further comprise triggering a transmission to the BS of a second SRS using a periodic SRS resource set; and aborting, in response to the triggering the transmission to the BS of the second SRS, the transmission of the second SRS if the transmission of the second SRS collides with the transmission of the first SRS. Some aspects of method 700 further comprise triggering a transmission to the BS of a report including periodic channel state information (P-CSI) and/or semi-persistent channel state information (SP-CSI); and aborting, in response to the triggering the transmission to the BS of the report, the transmission of the report if (i) the transmission of the report collides with the transmission of the first SRS, and (ii) the UE is incapable of simultaneously transmitting (1) a SRS transmission, and (2) (a) a physical uplink control channel (PUCCH), or (b) a physical uplink shared channel (PUSCH) transmission.

Some aspects of method 700 further comprise receiving, from the BS, a downlink (DL) grant configured to schedule the data transmission received from the BS and trigger a transmission to the BS of a second SRS using a second SRS resource set that is an aperiodic resource set; and aborting, in response to the receiving the DL grant, the transmission to the BS of the first SRS. Some aspects of method 700 further comprise receiving, from the BS, an uplink (UL) grant configured to trigger a transmission to the BS of a second SRS using a second SRS resource set that is an aperiodic resource set; and aborting, in response to the receiving the UL grant, the transmission to the BS of the first SRS or the second SRS, and transmitting to the BS the second SRS or the first SRS, respectively, if (i) the transmission of the first SRS collides with the transmission of the second SRS; and (ii) if the UE is incapable of simultaneously transmitting the first SRS and the second SRS to the BS.

Some aspects of method 700 further comprise receiving, from the BS, an uplink (UL) grant configured to trigger a transmission to the BS of a second SRS using a second SRS resource set that is an aperiodic resource set; and selecting, in response to the receiving the UL grant, the first SRS or the second SRS to abort if (i) the transmission of the first SRS collides with the transmission of the second SRS; and (ii) if the UE is incapable of simultaneously transmitting the first SRS and the second SRS to the BS.

Recitations of Some Aspects of the Present Disclosure

Aspect 1: A method of wireless communication performed by a user equipment (UE), the method comprising: detecting an error when decoding a data transmission received from a base station (BS) via a bandwidth part (BWP); and triggering, in response to the detecting the error, a transmission to the BS of a first sounding resource signal (SRS) using a first SRS resource set of the BWP.

Aspect 2: The method of aspect 1, wherein an open-loop power control parameter of the first SRS is configured to be independent from a corresponding open-loop power control parameter of a second SRS configured to be transmitted using a second SRS resource set of the BWP, and the second SRS resource set configured for a new radio (NR) use case.

Aspect 3: The method of aspect 2, wherein the NR use case is an antenna switching operation.

Aspect 4: The method of aspect 2, wherein the NR use case is a codebook or a non-codebook operation.

Aspect 5: The method of as 2, wherein the NR use case is a beam management operation.

Aspect 6: The method of aspect 1, wherein the first SRS resource set is configured for an antenna switching operation.

Aspect 7: The method of aspect 6, wherein an open-loop power control parameter of the first SRS is configured to be match a corresponding open-loop power control parameter of a second SRS of the antenna switching operation configured to be transmitted using the first SRS resource set.

Aspect 8: The method of aspect 6, wherein a transmit power of the first SRS is configured to exceed a transmit power of a second SRS of the antenna switching operation configured to be transmitted using the first SRS resource set.

Aspect 9: The method of any of aspects 1-8, further comprising: receiving, from the BS, a downlink control information (DCI) message including a group transmission power control (TPC) command to configure a closed-loop power control parameter of the first SRS.

Aspect 10: The method of any of aspects 1-9, further comprising: receiving, from the BS, a physical downlink control channel (PDCCH) communication scheduling the data transmission received from the BS, the DCI message received prior to a last symbol of the PDCCH communication; and configuring, in response to the DCI message being received prior to the last symbol of the PDCCH communication, the closed-loop power control parameter of the first SRS (e.g., based on the TPC command).

Aspect 11: The method of any of aspects 1-9, wherein the DCI message is received at least a threshold number of symbols prior to a start of the transmission of the first SRS, the method further comprising: configuring, in response to the DCI message being received at least the threshold number of symbols prior to the start of the transmission of the first SRS, the closed-loop power control parameter of the first SRS.

Aspect 12: The method of aspect 11, wherein the threshold number of symbols is equal to a number of symbols corresponding to a minimum gap in slots between a DCI message scheduling a UL transmission via a PDCCH and a latter UL transmission via a PUSCH.

Aspect 13: The method of any of aspects 1-12, wherein the first SRS resource set is an aperiodic SRS resource set.

Aspect 14: The method of any of aspects 1-13, further comprising: detecting a scheduled transmission of a second SRS to the BS using a periodic SRS resource set; and aborting the scheduled transmission of the second SRS, in response to the detecting a collision between the scheduled transmission of the second SRS and transmission of the first SRS.

Aspect 15: The method of any of aspects 1-14, further comprising: detecting a scheduled transmission to the BS of a report including periodic channel state information (P-CSI) and/or semi-persistent channel state information (SP-CSI); and aborting, in response to the detecting the transmission to the BS of the report, the transmission of the report upon detecting a collision between the transmission of the report and the transmission of the first SRS, wherein the UE is incapable of simultaneously transmitting (1) a SRS transmission, and (2) (a) a physical uplink control channel (PUCCH), or (b) a physical uplink shared channel (PUSCH) transmission.

Aspect 16: The method of any of aspects 1-15, further comprising: receiving, from the BS, a downlink (DL) grant configured to schedule the data transmission received from the BS, wherein the first RS is not transmitted when the DL grant includes a trigger for transmission of a second SRS using a second SRS resource set that is an aperiodic resource set.

Aspect 17: The method of any of aspects 1-16, further comprising: receiving, from the BS, an uplink (UL) grant configured to trigger a transmission to the BS of a second SRS using a second SRS resource set that is an aperiodic resource set; and aborting, in response to the receiving the UL grant, the transmission to the BS of the first SRS or the second SRS, and transmitting to the BS the second SRS or the first SRS, respectively, if (i) the transmission of the first SRS collides with the transmission of the second SRS; and (ii) if the UE is incapable of simultaneously transmitting the first SRS and the second SRS to the BS.

Aspect 18: The method of any of aspects 1-17, further comprising: receiving, from the BS, an uplink (UL) grant configured to trigger a transmission to the BS of a second SRS using a second SRS resource set that is an aperiodic resource set; and selecting, in response to the receiving the UL grant, the first SRS or the second SRS to abort if (i) the transmission of the first SRS collides with the transmission of the second SRS; and (ii) if the UE is incapable of simultaneously transmitting the first SRS and the second SRS to the BS.

Aspect 19: A user equipment (UE), comprising: a memory; a processor coupled to the memory; and a transceiver coupled to the processor, the UE configured to perform the methods of aspects 1-18.

Aspect 20: A user equipment (UE) comprising means for performing the methods of aspects 1-18.

Aspect 21: A non-transitory computer-readable medium (CRM) having program code recorded thereon, the program code comprises code for causing a user equipment (UE) to perform the methods of aspects 1-18.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   detecting an error when decoding a data transmission received from a base station (BS) via a bandwidth part (BWP);
   transmitting, to the BS in response to detecting the error, a feedback signal associated with the data transmission; and
   transmitting, to the BS in response to the transmitting the feedback signal, a first sounding resource signal (SRS) using a first aperiodic SRS resource set of the BWP, wherein the first SRS aperiodic resource set is configured for an antenna switching operation, and wherein a transmit power of the first SRS is configured to exceed a transmit power of a second SRS of the antenna switching operation configured to be transmitted using the first aperiodic SRS resource set.

2. The method of claim 1, wherein an open-loop power control parameter of the first SRS is configured to be independent from a corresponding open-loop power control parameter of a second SRS configured to be transmitted using a second SRS resource set of the BWP, the second SRS resource set configured for a new radio (NR) use case.

3. The method of claim 2, wherein the NR use case is at least one of an antenna switching operation, a beam management operation, a codebook operation, or a non-codebook operation.

4. The method of claim 1, wherein an open-loop power control parameter of the first SRS is configured to match a corresponding open-loop power control parameter of a second SRS of the antenna switching operation configured to be transmitted using the first SRS resource set.

5. The method of claim 1, further comprising:
   receiving, from the BS, a downlink control information (DCI) message including a group transmission power control (TPC) command to configure a closed-loop power control parameter of the first SRS.

6. The method of claim 5, further comprising:
   receiving, from the BS, a physical downlink control channel (PDCCH) communication scheduling the data transmission received from the BS, the DCI message received prior to a last symbol of the PDCCH communication; and
   configuring, in response to the DCI message being received prior to the last symbol of the PDCCH communication, the closed-loop power control parameter of the first SRS based on the TPC command.

7. The method of claim 5, wherein the DCI message is received at least a threshold number of symbols prior to a start of the transmission of the first SRS, the method further comprising:
configuring, in response to the DCI message being received at least the threshold number of symbols prior to the start of the transmission of the first SRS, the closed-loop power control parameter of the first SRS.

8. The method of claim 7, wherein:
the threshold number of symbols is equal to a number of symbols corresponding to a minimum gap in slots between a DCI message scheduling an uplink (UL) transmission via a PDCCH and a later UL transmission via a PUSCH.

9. The method of claim 1, further comprising:
detecting a scheduled transmission of a second SRS to the BS using a periodic SRS resource set; and
aborting the scheduled transmission of the second SRS in response to detecting a collision between the scheduled transmission of the second SRS and the transmission of the first SRS.

10. The method of claim 1, further comprising:
detecting a scheduled transmission to the BS of a report including periodic channel state information (P-CSI) or semi-persistent channel state information (SP-CSI); and
aborting, in response to the detecting the scheduled transmission to the BS of the report, the transmission of the report upon detecting that the transmission of the report collides with the transmission of the first SRS.

11. The method of claim 1, further comprising:
receiving, from the BS, a downlink (DL) grant configured to schedule the data transmission received from the BS, wherein the first SRS is not transmitted when the DL grant includes a trigger for transmission of a second SRS using a second SRS resource set that is an aperiodic resource set.

12. The method of claim 1, further comprising:
receiving, from the BS, an uplink (UL) grant configured to trigger a transmission to the BS of a second SRS using a second SRS resource set that is an aperiodic resource set; and
transmitting, in response to the receiving the UL grant, the second SRS to the BS when (i) the UE is incapable of simultaneously transmitting to the BS the first SRS and the second SRS and (ii) the UE detects a collision between the first SRS and the second SRS.

13. The method of claim 1, further comprising:
receiving, from the BS, an uplink (UL) grant configured to trigger a transmission to the BS of a second SRS using a second SRS resource set that is an aperiodic resource set; and
selecting, in response to the receiving the UL grant, one of the first SRS and the second SRS to transmit if:
(i) the transmission of the first SRS collides with the transmission of the second SRS; and
(ii) the UE is incapable of simultaneously transmitting the first SRS and the second SRS to the BS.

14. A user equipment (UE), comprising:
a memory;
a transceiver; and
at least one processor coupled to the memory and the transceiver, wherein the UE is configured to:
detect an error when decoding a data transmission received from a base station (BS) via a bandwidth part (BWP);
transmit, to the BS in response to detecting the error, a feedback signal associated with the data transmission; and
trigger, to the BS in response to transmitting the feedback signal, a first sounding resource signal (SRS) using a first aperiodic SRS resource set of the BWP, wherein the first SRS aperiodic resource set is configured for an antenna switching operation, and wherein a transmit power of the first SRS is configured to exceed a transmit power of a second SRS of the antenna switching operation configured to be transmitted using the first aperiodic SRS resource set.

15. The UE of claim 14, wherein an open-loop power control parameter of the first SRS is configured to be independent from a corresponding open-loop power control parameter of a second SRS configured to be transmitted using a second SRS resource set of the BWP, the second SRS resource set configured for a new radio (NR) use case.

16. The UE of claim 14, wherein:
an open-loop power control parameter of the first SRS is configured to match a corresponding open-loop power control parameter of a second SRS of the antenna switching operation configured to be transmitted using the first SRS resource set.

17. The UE of claim 14, wherein the UE is further configured to:
receive, from the BS, a downlink control information (DCI) message including a group transmission power control (TPC) command to configure a closed-loop power control parameter of the first SRS.

18. The UE of claim 17, wherein:
the UE is further configured to:
receive, from the BS, a physical downlink control channel (PDCCH) communication scheduling the data transmission received from the BS, the DCI message received prior to a last symbol of the PDCCH communication; and
the processor is further configured to:
configure, in response to the DCI message being received prior to the last symbol of the PDCCH communication, the closed-loop power control parameter of the first SRS based on the TPC command.

19. The UE of claim 14, wherein the UE is further configured to:
trigger a transmission to the BS of a second SRS using a periodic SRS resource set; and
abort, in response to the triggering of the transmission to the BS of the second SRS, the transmission of the second SRS upon detecting a collision between the transmission of the second SRS and the transmission of the first SRS.

20. The UE of claim 14, wherein the UE is further configured to:
detect a transmission to the BS of a report including periodic channel state information (P-CSI) and/or semi-persistent channel state information (SP-CSI); and
abort, in response to the detection of the transmission to the BS of the report, the transmission of the report upon detecting a collision between the transmission of the report and the transmission of the first SRS.

21. The UE of claim 14, wherein the UE is further configured to:
receive, from the BS, a downlink (DL) grant configured to schedule the data transmission received from the BS, wherein the first SRS is not transmitted when the DL grant includes a trigger for transmission of a second SRS using a second SRS resource set that is an aperiodic resource set.

22. The UE of claim 14, wherein the UE is further configured to:
receive, from the BS, an uplink (UL) grant configured to trigger a transmission to the BS of a second SRS using a second SRS resource set that is an aperiodic resource set; and
transmit, in response to the receiving the UL grant, the second SRS to the BS when (i) the UE is incapable of simultaneously transmitting to the BS the first SRS and the second SRS and (ii) the UE detects a collision between the first SRS and the second SRS.

23. The UE of claim 14, wherein the UE is further configured to:
receive, from the BS, an uplink (UL) grant configured to trigger a transmission to the BS of a second SRS using a second SRS resource set that is an aperiodic resource set,
the processor further configured to:
select, in response to the receiving of the UL grant, one of the first SRS and the second SRS to transmit if:
(i) the transmission of the first SRS collides with the transmission of the second SRS; and
(ii) the UE is incapable of simultaneously transmitting the first SRS and the second SRS to the BS.

24. A non-transitory computer-readable medium (CRM) having program code recorded thereon, the program code comprising:
code for causing a UE to detect an error when decoding a data transmission received from a base station (BS) via a bandwidth part (BWP);
code for causing the UE to transmit, to the BS in response to the detecting the error, a feedback signal associated with the data transmission; and
code for causing the UE to transmit, to the BS in response to the transmitting the feedback signal, a first sounding resource signal (SRS) using a first aperiodic SRS resource set of the BWP, wherein the first SRS aperiodic resource set is configured for an antenna switching operation, and wherein a transmit power of the first SRS is configured to exceed a transmit power of a second SRS of the antenna switching operation configured to be transmitted using the first aperiodic SRS resource set.

25. A user equipment (UE), comprising:
means for detecting an error when decoding a data transmission received from a base station (BS) via a bandwidth part (BWP);
means for transmitting, to the BS in response to the detecting the error, a feedback signal associated with the data transmission; and
means for transmitting, to the BS in response to the transmitting the feedback signal, a first sounding resource signal (SRS) using a first aperiodic SRS resource set of the BWP wherein the first SRS aperiodic resource set is configured for an antenna switching operation, and wherein a transmit power of the first SRS is configured to exceed a transmit power of a second SRS of the antenna switching operation configured to be transmitted using the first aperiodic SRS resource set.

26. The UE of claim 25, wherein an open-loop power control parameter of the first SRS is configured to be independent from a corresponding open-loop power control parameter of a second SRS configured to be transmitted using a second SRS resource set of the BWP, the second SRS resource set configured for a new radio (NR) use case.

27. The UE of claim 26, wherein the NR use case is at least one of an antenna switching operation, a beam management operation, a codebook operation, or a non-codebook operation.

28. The UE of claim 25, wherein an open-loop power control parameter of the first SRS is configured to match a corresponding open-loop power control parameter of a second SRS of the antenna switching operation configured to be transmitted using the first SRS resource set.

29. The UE of claim 25, further comprising:
means for receiving, from the BS, a downlink control information (DCI) message including a group transmission power control (TPC) command to configure a closed-loop power control parameter of the first SRS.

30. The UE of claim 29, further comprising:
means for receiving, from the BS, a physical downlink control channel (PDCCH) communication scheduling the data transmission received from the BS, the DCI message received prior to a last symbol of the PDCCH communication; and
means for configuring, in response to the DCI message being received prior to the last symbol of the PDCCH communication, the closed-loop power control parameter of the first SRS based on the TPC command.

* * * * *